(12) United States Patent
Ishii et al.

(10) Patent No.: US 9,208,622 B2
(45) Date of Patent: Dec. 8, 2015

(54) RESISTANCE ESTIMATION APPARATUS, ENERGY ESTIMATION APPARATUS, SYSTEM, METHOD AND PROGRAM

(71) Applicant: KABUSHIKI KAISHA TOSHIBA, Minato-ku, Tokyo (JP)

(72) Inventors: Ena Ishii, Kanagawa (JP); Mitsunobu Yoshida, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/445,265

(22) Filed: Jul. 29, 2014

(65) Prior Publication Data

US 2015/0039178 A1      Feb. 5, 2015

(30) Foreign Application Priority Data

Jul. 31, 2013   (JP) .................................. 2013-159782

(51) Int. Cl.
*G07C 5/00* (2006.01)
*B60W 30/00* (2006.01)

(52) U.S. Cl.
CPC ................ *G07C 5/004* (2013.01); *B60W 30/00* (2013.01)

(58) Field of Classification Search
CPC ....... G07C 5/004; B60W 30/00; F16H 61/12; F16H 61/66; F16H 61/18
USPC .......................... 701/36, 32.3, 32.5, 32.8, 32.9
See application file for complete search history.

(56) References Cited

U.S. PATENT DOCUMENTS

2014/0121889 A1* 5/2014 Sodergren et al. ........... 701/32.9
2015/0006052 A1* 1/2015 Sannodo et al. ................ 701/70

FOREIGN PATENT DOCUMENTS

| JP | 2000-287302 A | 10/2000 |
|---|---|---|
| JP | 2001-183150 A | 7/2001 |
| JP | 2009-106130 A | 5/2009 |
| JP | 2010-115065 A | 5/2010 |
| JP | 2011-046377 A | 3/2011 |
| JP | 2013-007570 A | 1/2013 |
| JP | 2013-075561 A | 4/2013 |

OTHER PUBLICATIONS

Ishii, et al.; "Development of an EV simulator for estimating electric energy consumption using running resistances varying by location"; Proc. of 20th ITS World Congress Tokyo, 2013, No. 3372; 10 pages.

* cited by examiner

*Primary Examiner* — Kim T Nguyen
(74) *Attorney, Agent, or Firm* — Ohlandt, Greeley, Ruggiero & Perle, L.L.P.

(57) ABSTRACT

According to one embodiment, a resistance estimation apparatus includes a first detection unit, a second detection unit, a third detection unit and a first calculation unit. The first detection unit detects, as an output value, an output of a driving source of a vehicle. The second detection unit detects, as a braking value, a strength of a braking force. The third detection unit detects a speed of the vehicle. The first calculation unit calculates a traveling resistance resulting from a road surface that the vehicle has traveled during a traveling period, using a vehicle characteristic, the output value, the braking value and the speed, the traveling period including a period from a first time point when the vehicle starts and the speed changes from zero to a second time point when the vehicle stops and the speed changes to zero.

16 Claims, 13 Drawing Sheets

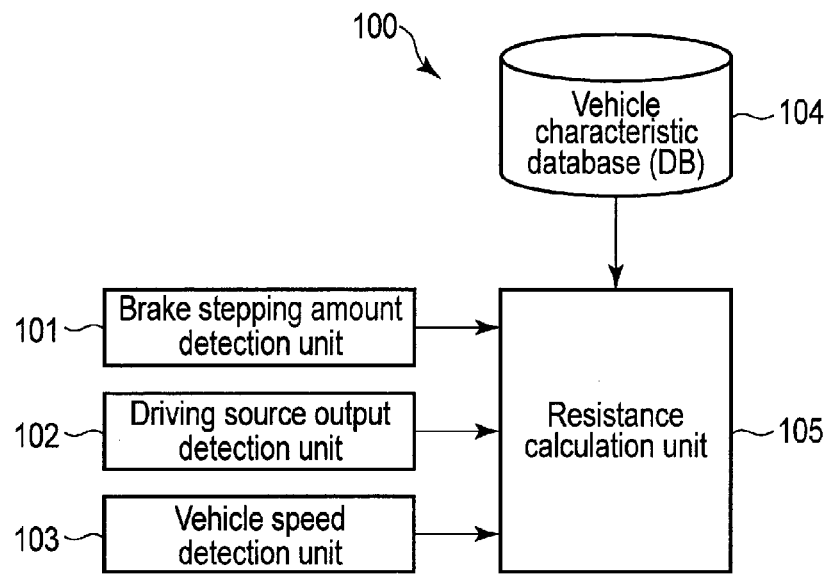
F I G. 1
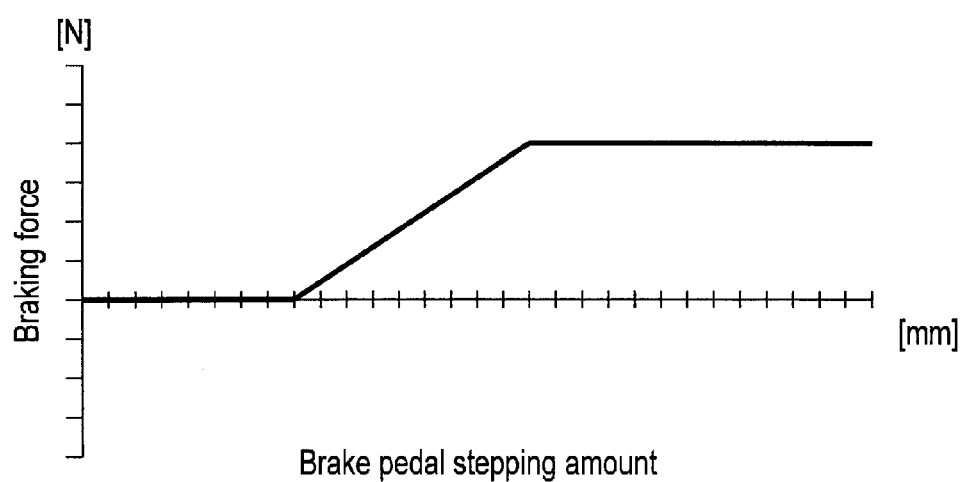
F I G. 2

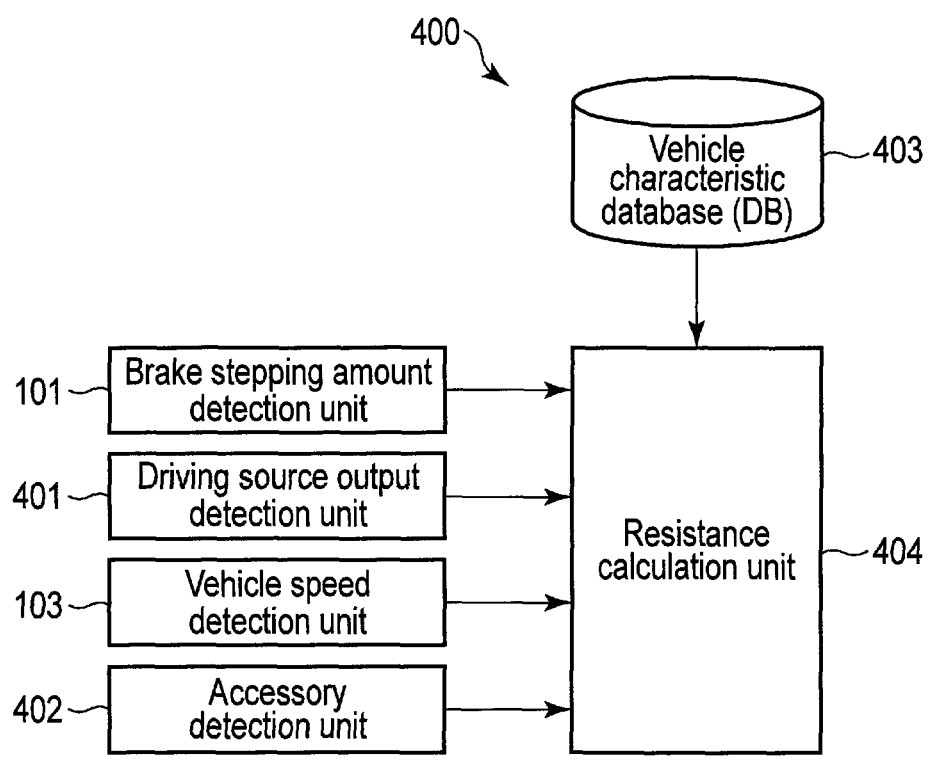
F I G. 4

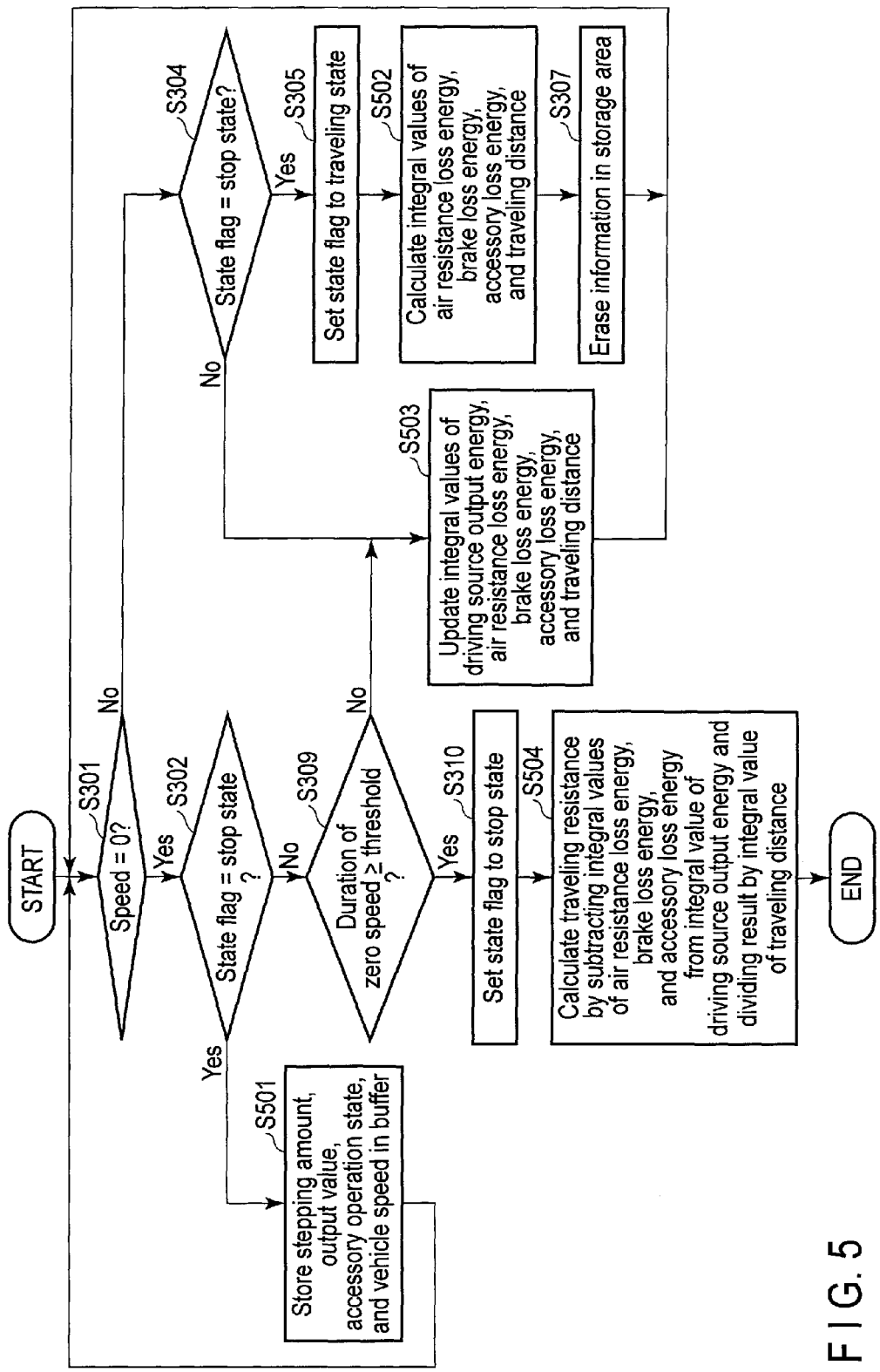
F I G. 5

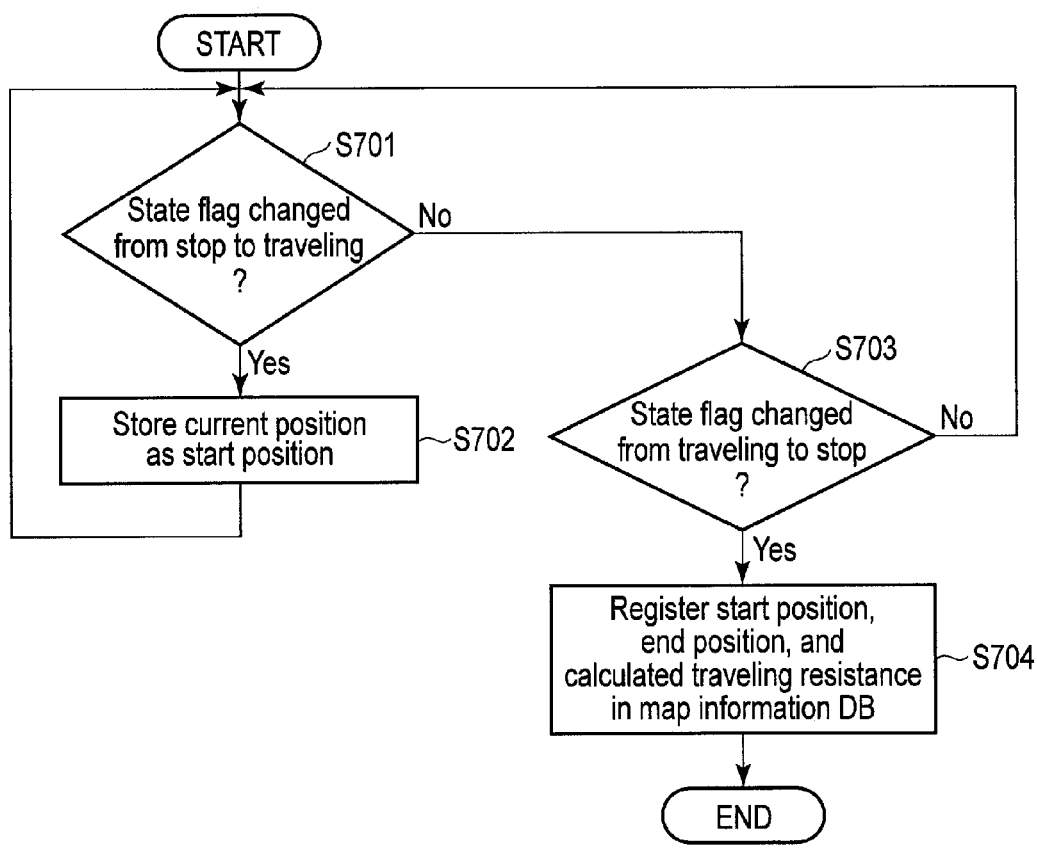
F I G. 7

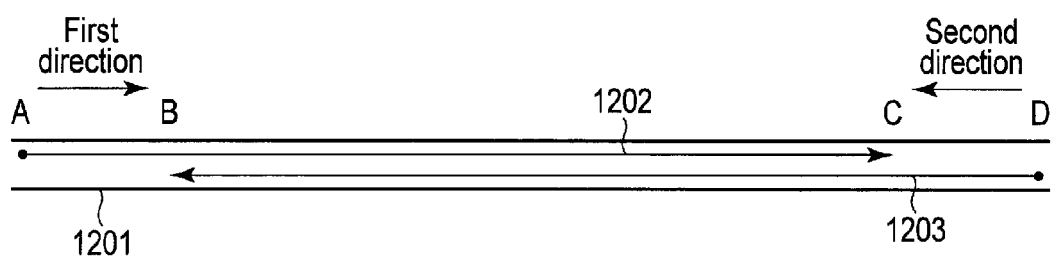
F I G. 12

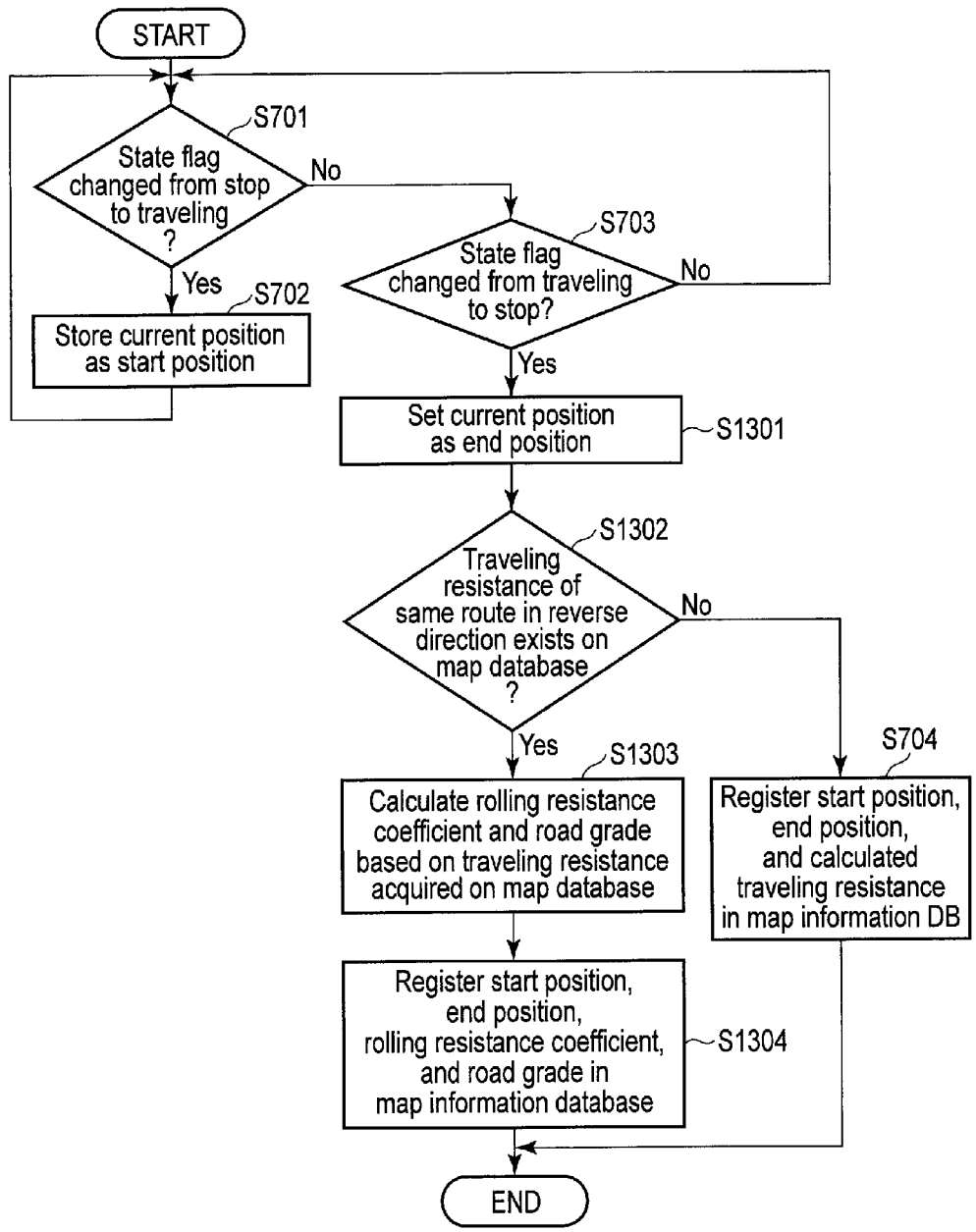
F I G. 13

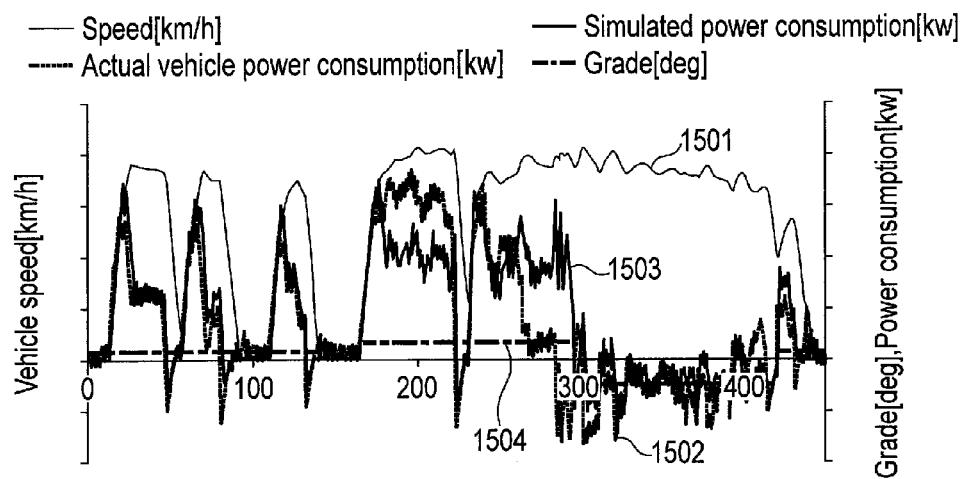
F I G. 15
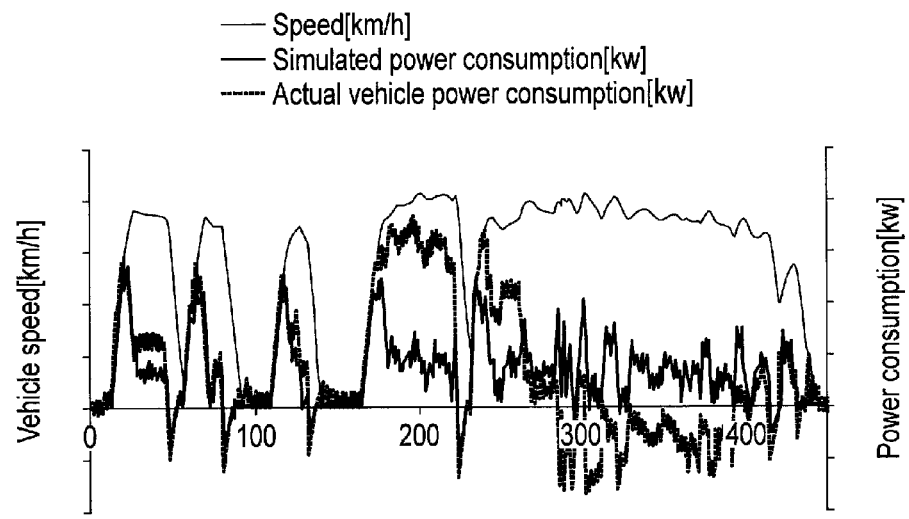
F I G. 16

RESISTANCE ESTIMATION APPARATUS, ENERGY ESTIMATION APPARATUS, SYSTEM, METHOD AND PROGRAM

CROSS-REFERENCE TO RELATED APPLICATIONS

This application is based upon and claims the benefit of priority from Japanese Patent Application No. 2013-159782, filed Jul. 31, 2013, the entire contents of which are incorporated herein by reference.

FIELD

Embodiments described herein relate generally to a resistance estimation apparatus, an energy estimation apparatus, system, method and program.

BACKGROUND

An onboard device such as a car navigator needs a technique for estimating the energy necessary to travel a given route. As a technique of calculating the energy necessary for traveling, resistances such as an air resistance, a grade (hill-climbing) resistance, a rolling resistance, and an acceleration resistance at the time of traveling are calculated and added. However, since the road grade or road surface state changes depending on the point, it is difficult to correctly grasp the value of the grade resistance or rolling resistance.

Hence, a technique of calculating a road grade by subtracting the energy consumed by accessories and an energy loss generated by traveling resistances other than the grade from the energy of an entire vehicle is used.

BRIEF DESCRIPTION OF THE DRAWINGS

FIG. 1 is a block diagram illustrating a resistance estimation apparatus according to the first embodiment;

FIG. 2 is a graph illustrating the relationship between the braking force and the stepping amount of a brake pedal;

FIG. 4 is a block diagram illustrating a resistance estimation apparatus according to the second embodiment;

FIG. 5 is a flowchart illustrating the operation of the resistance estimation apparatus according to the second embodiment;

FIG. 7 is a flowchart illustrating registration processing of a map information registration unit according to the third embodiment;

FIG. 12 is a conceptual view illustrating bidirectionally traveling the same route;

FIG. 13 is a flowchart illustrating the operation of a map information registration unit according to the sixth embodiment;

FIG. 15 is a graph illustrating an energy consumption estimation result calculated according to one of the embodiments; and FIG. 16 is a graph illustrating an energy consumption estimation result calculated by a conventional technique.

DETAILED DESCRIPTION

Figure 3:
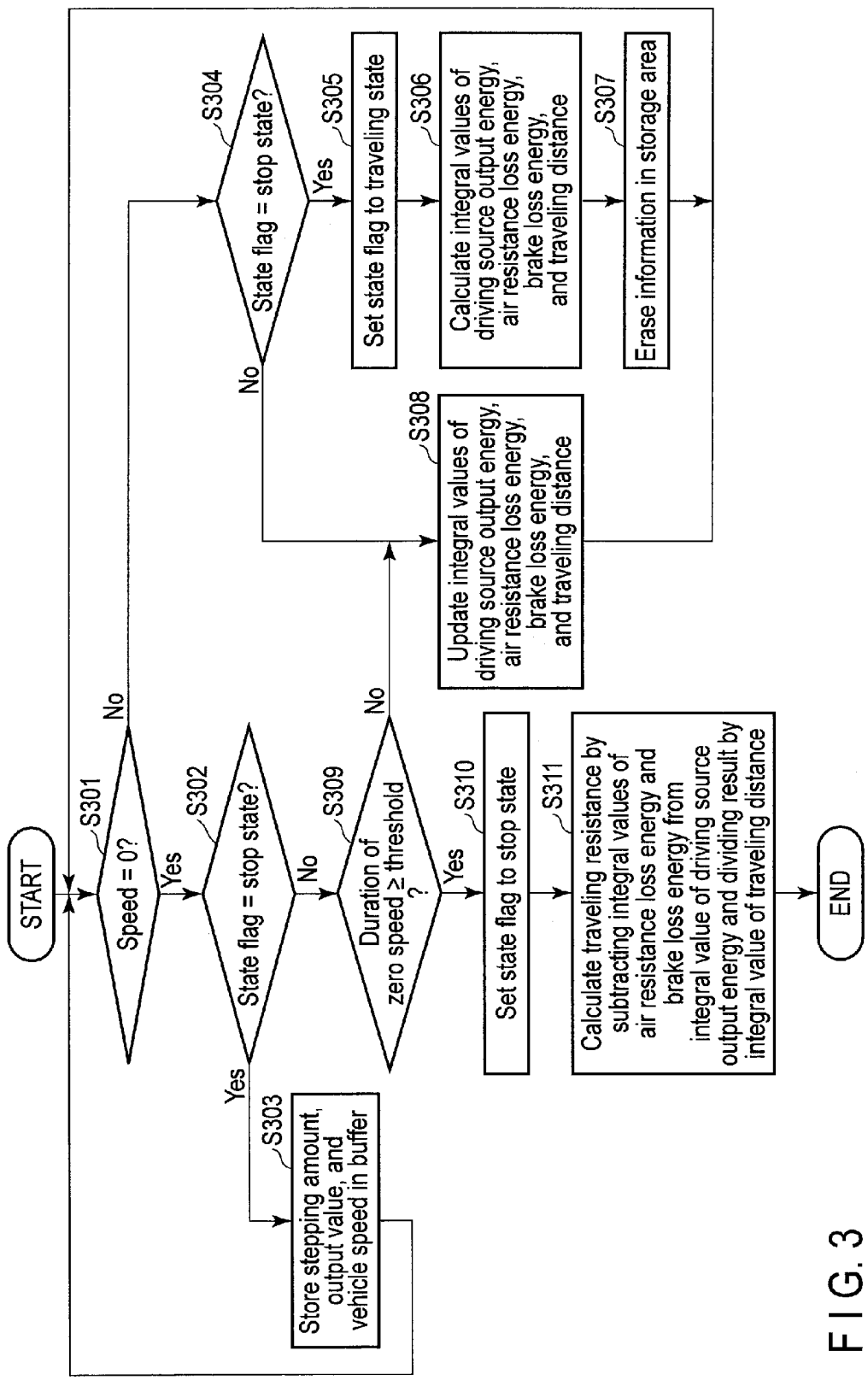
FIG. 3 is a flowchart illustrating the operation of a resistance calculation unit according to the first embodiment.

In the above-described technique, however, since the road grade is calculated in every processing cycle, it is difficult to calculate a correct grade because of the influence of noise in the detection system or the influence of a time lag from a change in the energy source output to a change in the vehicle speed, particularly during acceleration and deceleration.

In general, according to one embodiment, a resistance estimation apparatus includes a first detection unit, a second detection unit, a third detection unit and a first calculation unit. The first detection unit is configured to detect, as an output value, an output of a driving source of a vehicle. The second detection unit is configured to detect, as a braking value, a strength of a braking force of a brake of the vehicle. The third detection unit is configured to detect a speed of the vehicle. The first calculation unit is configured to calculate a traveling resistance resulting from a road surface on which the vehicle has traveled during a traveling period, using a vehicle characteristic, the output value, the braking value and the speed, the traveling period including a period from a first time point when the vehicle starts and the speed changes from zero to a second time point when the vehicle stops and the speed changes to zero, the vehicle characteristic representing a characteristic of the vehicle including a weight of the vehicle and a frontal projected area of the vehicle.

A resistance estimation apparatus, an energy estimation apparatus, system, method and program according to the present embodiments will now be described in detail with reference to the accompanying drawings. Note that the same reference numerals denote parts that perform the same operations in the following embodiments, and a repetitive description will be omitted.

First Embodiment

A resistance estimation apparatus according to the first embodiment will be described with reference to the block diagram of FIG. 1.

A resistance estimation apparatus 100 according to this embodiment includes a brake stepping amount detection unit 101 (second detection unit), a driving source output detection unit 102 (first detection unit), a vehicle speed detection unit 103 (third detection unit), a vehicle characteristic database 104 (to be referred to as a vehicle characteristic DB 104 hereinafter), and a resistance calculation unit 105 (first calculation unit).

The brake stepping amount detection unit 101 detects the strength of the braking force of the brake and obtains a braking value. In this embodiment, a user stepping on a brake pedal provided in a vehicle is detected, and a stepping amount representing how much the user has stepped on the brake pedal is obtained as the braking value. Note that the vehicle is assumed to be a vehicle such as an automobile, including an electric vehicle, that travels on a road. However, the present embodiment is not limited to this, and is also applicable to another means of transportation. In this embodiment, a brake pedal is assumed as a braking means, and the strength of a braking force is determined by the stepping amount. However, any other detection criterion which can detect the strength of the braking force of the braking means and acquire the braking value, such as a button press amount, is also usable.

The driving source output detection unit 102 detects the output of the driving source of the vehicle and obtains an output value. The driving source of the vehicle is, for example, an engine or an electric motor. The output value can be calculated from a torque and a rotation speed.

The vehicle speed detection unit 103 detects the speed of the vehicle upon traveling.

The vehicle characteristic DB 104 stores, for each vehicle, a vehicle characteristic that is information about a characteristic of a vehicle. The vehicle characteristic includes, for example, the weight of the vehicle, the air resistance coefficient, the frontal projected area of the vehicle, and the relational expression between the braking force and the stepping amount of the brake pedal.

The resistance calculation unit 105 receives the braking value from the brake stepping amount detection unit 101, the output value from the driving source output detection unit 102, the speed from the vehicle speed detection unit 103, and the vehicle characteristic from the vehicle characteristic DB 104. Based on the braking value, the output value, the speed, and the vehicle characteristic, the resistance calculation unit 105 calculates a traveling resistance that is a resistance resulting from the road surface on which the vehicle has traveled during a traveling period that is a period from the time point when the vehicle starts, and the speed changes from zero to the time point when the vehicle stops, and the speed changes to zero.

The relationship between the braking force and the stepping amount of the brake pedal will be described with reference to FIG. 2.

FIG. 2 is a graph of a relational expression representing the relationship between the braking force and the stepping amount of the brake pedal. The vertical axis represents the braking force, and the horizontal axis represents the stepping amount of the brake pedal. Except for the play portion of the brake pedal, the strength of the braking force is proportional to the stepping amount, and a braking force corresponding to a stepping amount can be obtained as a braking value. Such a relational expression is generated for each vehicle and stored in the vehicle characteristic DB 104.

Traveling resistance calculation processing of the resistance calculation unit 105 according to the first embodiment will be described next with reference to the flowchart of FIG. 3.

Note that the calculation cycle of processing from step S301 shown in FIG. 3 is preferably set to several milliseconds to several seconds. However, the present embodiment is not limited to this, and the calculation may be done in a shorter cycle.

In step S301, it is determined whether or not the speed is zero. Whether or not the speed is zero can be determined based on the speed obtained from the vehicle speed detection unit 103. If the speed is zero, the process advances to step S304. If the speed is not zero, that is, if the vehicle is moving, the process advances to step S302.

In step S302, it is determined whether or not a state flag represents a stop state. The state flag is a flag decided based on the speed of the vehicle, and is set to, for example, 1 when the vehicle is in a traveling state or 0 (zero) when the vehicle is in a stop state. If the state flag represents the stop state, the process advances to step S303. If the state flag does not represent the stop state, that is, if the state flag represents the traveling state, the process advances to step S309.

In step S303, since the vehicle is in the stop state, the stepping amount, the output value, and the speed are stored. These data are stored in, for example, a buffer. When the buffer capacity is full, and new data cannot be stored, oldest data is erased, and latest data may be stored. The buffer preferably has at least a capacity capable of storing data corresponding to a time from a change in the driving source output to a change in the vehicle speed. For example, in a vehicle that needs 0.1 sec from occurrence of an output in the driving source to the start of the vehicle, if the calculation cycle of the resistance calculation unit 105 is 0.01 sec, the buffer capacity is set to store data of 10 cycles. When the processing of step S303 ends, the process returns to step S301 to repeat the same processing as described above.

In step S304, it is determined whether or not the state flag represents the stop state. If the state flag represents the stop state, the process advances to step S305. If the state flag does not represent the stop state, the process advances to step S308.

In step S305, the state flag is set to the traveling state because the vehicle is starting from the stop state at this stage.

In step S306, the integral values of driving source output energy, air resistance loss energy, brake loss energy, and a traveling distance are calculated based on the stepping amount, the output value, and the speed. For example, when the buffer stores data of 10 calculation cycles, integration processing is performed for all the data.

The driving source output energy is the output energy of the driving source. This value is obtained by time-integrating the product of the angular velocity and the output torque of the driving source. The air resistance loss energy is the loss energy generated by the air resistance. This value is obtained by time-integrating the product of the air resistance force and the vehicle speed. The air resistance force can be calculated, using the air resistance coefficient and the frontal projected area obtained from the vehicle characteristic DB 104, by $$\text{Air resistance force}[N] = \frac{R \times F \times P \times V^2}{2} \quad (1)$$

$R$: Air resistance coefficient $F$: Frontal projected area[m$^2$]

$P$: Air density [kg/m$^3$]

$V$: Vehicle speed [m/s].

Note that the product of the air resistance coefficient and the frontal projected area may be calculated in advance and stored in the vehicle characteristic DB 104. The air density is a constant in this embodiment but may change in accordance with the altitude.

The brake loss energy is loss energy generated by the braking force of the brake. This value is obtained by time-integrating the product of the braking value and the speed or time-integrating the product of the brake torque and the rotation speed of the brake acting portion. The brake loss energy is calculated using, for example, the relational expression of the graph shown in FIG. 2. Note that as for the braking value, the relationship between the braking force and the stepping amount of the brake pedal may be measured in advance and stored as a table format in the vehicle characteristic DB 104, and a braking value corresponding to a stepping amount detected by the brake stepping amount detection unit 101 may be acquired from the vehicle characteristic DB 104. Alternatively, when calculating the brake loss energy, the resistance calculation unit 105 may calculate the deceleration from the speed and calculate the braking force as the function of the speed and the deceleration.

The traveling distance is calculated by time-integrating the speed.

In step S307, to free up the buffer, the data of the stepping amount, the output value, and the speed are erased. The process then returns to step S301 to repeat the same processing as described above.

In step S308, since the vehicle is in the traveling state, the integral values of the driving source output energy, the air resistance loss energy, the brake loss energy, and the traveling distance are updated based on the stepping amount, the output value, and the speed newly detected by the brake stepping amount detection unit 101, the driving source output detection unit 102, and the vehicle speed detection unit 103, respectively. When the process of step S308 ends, the process returns to step S301 to repeat the same processing as described above.

In step S309, the speed is zero and the state flag does not represent the stop state, that is, the vehicle is going to stop at this stage. Accordingly, it is determined whether or not and the duration of zero speed is equal to or more than a threshold. The threshold is set to be, for example, almost the same time as that needed to store data up to the buffer capacity. If the duration of zero speed is equal to or more than the threshold, the process advances to step S310. If the duration of zero speed is less than the threshold, it is determined that the vehicle has not stopped yet, and the process advances to step S308.

In step S310, it is determined that the vehicle has stopped, and the state flag is set to the stop state.

In step S311, the integral value of the air resistance loss energy and the integral value of the brake loss energy are subtracted from the integral value of the driving source output energy, thereby calculating the integral value of loss energy generated by a resistance including both a road grade and a rolling resistance. When this integral value is divided by the integral value of the traveling distance, a traveling resistance force including both a road grade and a rolling resistance can be calculated. The operation of the resistance calculation unit 105 thus ends.

The processing of the resistance calculation unit 105 shown in FIG. 3 is performed based on the output value, the stepping amount, and the speed during the traveling period from the time point going back a predetermined period from the time point when the vehicle starts and the speed changes from zero, to the time point after the elapse of a predetermined period from the time point when the vehicle stops. This makes it possible to reduce the influence of a time lag or the influence of noise in the detection system.

Note that the traveling resistance may be calculated during a period from the time point when the vehicle starts and the speed changes from zero, to the time point when the vehicle stops and the speed changes to zero. In this case, the processes of steps S303, S307, and S309 are not performed. If the traveling state flag represents the stop state in step S302, the process returns to step S301. If the traveling state flag does not represent the stop state, that is, represents the traveling state, the process advances to step S310.

According to the above-described first embodiment, the traveling resistance is calculated based on the output energy and loss energy from the start to the stop of the vehicle. This makes it possible to stably and accurately estimate the traveling resistance without the influence of a time lag from a change in the output to a change in the vehicle speed or the influence of noise in the detection system.

Second Embodiment

The second embodiment is different from the first embodiment in that the resistance force is calculated considering the energy consumed by accessories as well. The term 'accessories' refers to devices that operate by receiving energy directly from the driving energy source. When, for example, an accessory battery is charged by the driving energy source, the accessory battery is regarded as an accessory.

A resistance estimation apparatus according to the second embodiment will be described with reference to the block diagram of FIG. 4.

A resistance estimation apparatus 400 according to the second embodiment includes a brake stepping amount detection unit 101, a vehicle speed detection unit 103, a driving source output detection unit 401, an accessory detection unit 402, a vehicle characteristic DB 403, and a resistance calculation unit 404.

The brake stepping amount detection unit 101, and the vehicle speed detection unit 103 are the same as in the first embodiment, and a description thereof will be omitted here.

The driving source output detection unit 401 is almost the same as the driving source output detection unit 102 according to the first embodiment except that it obtains an output value by detecting the output of the driving energy source of a vehicle. The driving energy source is, for example, a secondary battery. For example, in a vehicle driven by a secondary battery, the output value of the driving energy source includes the voltage value and current value of the secondary battery.

The accessory detection unit 402 detects the operation state of each accessory. The operation state of an accessory indicates, for example, the on/off state of a light or the rotation speed of an electric compressor capable of adjusting the rotation speed.

The vehicle characteristic DB 403 stores the correspondence between the operation state and the power (if an accessory is an electric accessory, power consumption for the electric accessory) of each accessory in addition to the data stored in the vehicle characteristic DB 104 according to the first embodiment. The vehicle characteristic DB 403 stores data representing that, for example, when the headlight is on, the power consumption is 50 W.

The resistance calculation unit 404 receives a braking value from the brake stepping amount detection unit 101, an output value from the driving source output detection unit 401, a speed from the vehicle speed detection unit 103, the operation states of the accessories from the accessory detection unit 402, and the vehicle characteristic and powers corresponding to the operation states of the accessories from the vehicle characteristic DB 403. Based on the braking value, the output value, the speed, the vehicle characteristic, and the powers corresponding to the operation states of the accessories, the resistance calculation unit 404 calculates a traveling resistance during a traveling period.

The operation of the resistance estimation apparatus according to the second embodiment will be described next with reference to the flowchart of FIG. 5.

Processes other than those of steps S501 to S504 are the same as in the steps of FIG. 3, and a description thereof will be omitted here.

In step S501, the stepping amount, the output value, the speed, and the operation states of the accessories are stored in the buffer.

In step S502, the integral value of accessory loss energy is calculated in addition to the integral values of driving source output energy, air resistance loss energy, brake loss energy, and a traveling distance calculated as in step S306. The accessory loss energy is the loss energy consumed by operating the accessories. This value is calculated by time-integrating the power (if an accessory is an electric accessory, power consumption for the electric accessory) of each accessory acquired from the vehicle characteristic DB 403, which corresponds to the operation state of the accessory recorded in the buffer.

In step S503, the integral values of the driving source output energy, the air resistance loss energy, the brake loss energy, the accessory loss energy, and the traveling distance are updated.

In step S504, the integral values of the air resistance loss energy, the brake loss energy, and the accessory loss energy are subtracted from the integral value of the driving source output energy, thereby obtaining the integral value of loss energy generated by a resistance including both a road grade and a rolling resistance. This integral value is divided by the integral value of the traveling distance, thereby calculating a traveling resistance force.

According to the above-described second embodiment, the traveling resistance is calculated considering the operation states of accessories as well. This makes it possible to stably and accurately estimate the traveling resistance even for, for example, an electric vehicle that uses a secondary battery as a driving source.

Third Embodiment

In the third embodiment, an energy estimation apparatus including a resistance estimation apparatus will be described. The energy estimation apparatus including the resistance estimation apparatus can correctly estimate the energy consumption from the current vehicle position to the destination.

Figure 6:
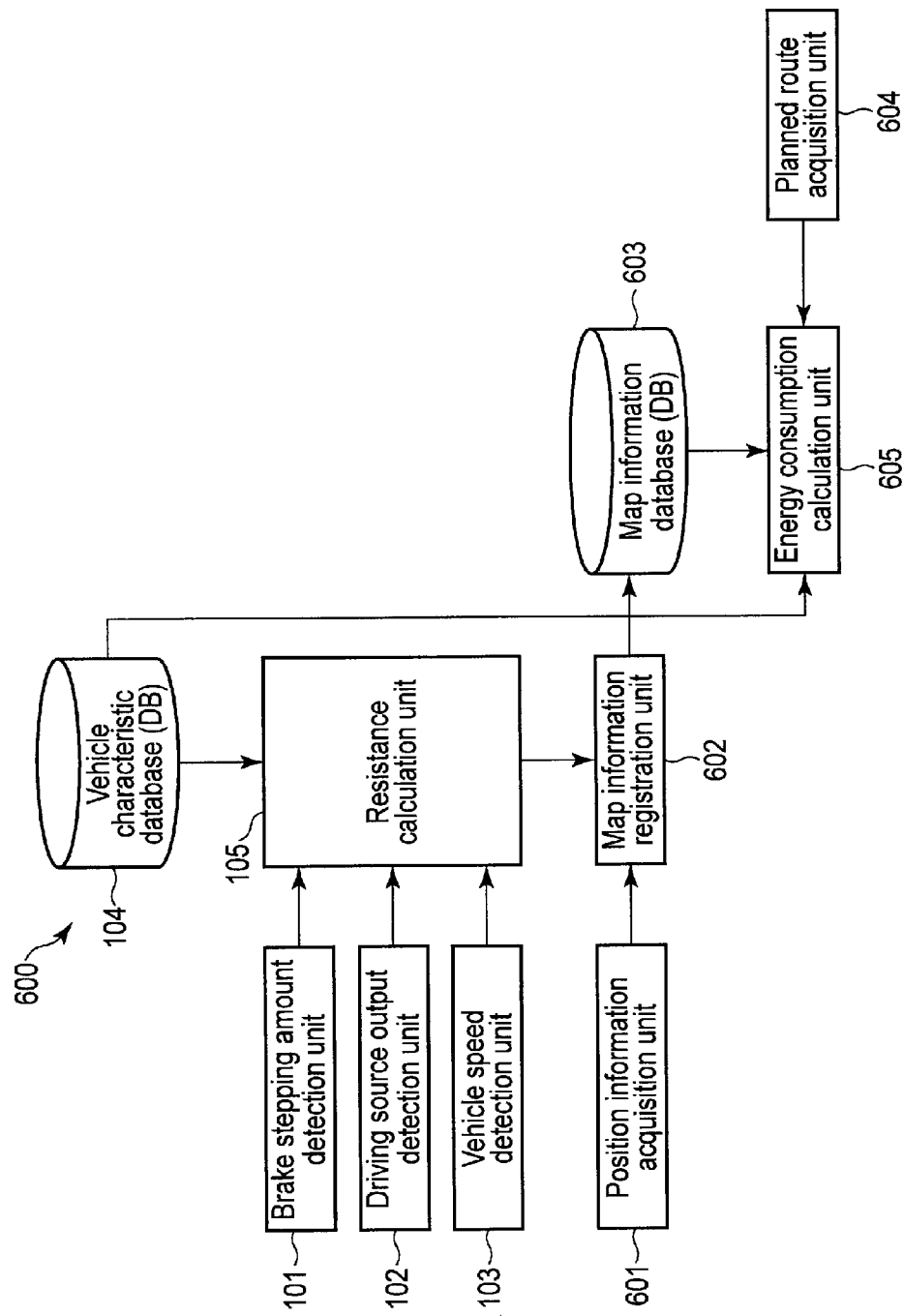
FIG. 6 is a block diagram illustrating an energy estimation apparatus according to the third embodiment.

The energy estimation apparatus according to the third embodiment will be described with reference to FIG. 6.

An energy estimation apparatus 600 according to the third embodiment includes a brake stepping amount detection unit 101, a driving source output detection unit 102, a vehicle speed detection unit 103, a vehicle characteristic DB 104, a resistance calculation unit 105, a position information acquisition unit 601 (first acquisition unit), a map information registration unit 602, a map information database 603 (to be also referred to as a map information DB 603), a planned route acquisition unit 604 (second acquisition unit), and an energy consumption calculation unit 605 (second calculation unit).

The brake stepping amount detection unit 101, the driving source output detection unit 102, the vehicle speed detection unit 103, the vehicle characteristic DB 104, and the resistance calculation unit 105 perform the same processes as in the above-described embodiments, and a description thereof will be omitted here.

The position information acquisition unit 601 acquires vehicle position information representing the position information of the vehicle from, for example, a GPS receiver.

The map information registration unit 602 receives a traveling resistance from the resistance calculation unit 105 and the vehicle position information from the position information acquisition unit 601, and registers the route the vehicle has traveled and the traveling resistance in the map database in association with each other based on the vehicle position information.

The map information DB 603 stores the map database, and stores the route on the map database and the traveling resistance in association with each other based on an instruction from the map information registration unit 602.

The planned route acquisition unit 604 acquires a planned route that is the route from the current position to the destination in accordance with a user input.

The energy consumption calculation unit 605 receives the vehicle characteristic from the vehicle characteristic DB 104, the traveling resistance associated with the map database from the map information DB 603, and the planned route from the planned route acquisition unit 604. Based on the traveling resistance corresponding to the planned route (also referred to as a corresponding traveling resistance), the energy consumption calculation unit 605 calculates the energy consumption, that is, the energy consumed by the vehicle when traveling the planned route.

Registration processing of the map information registration unit 602 will be described next with reference to the flowchart of FIG. 7. Note that the calculation cycle of registration processing is preferably equal to or longer than the calculation cycle of the resistance calculation unit 105.

In step S701, it is determined whether or not the state flag has changed from the stop state to the traveling state during the time from the preceding calculation cycle to the current calculation cycle. As for the state flag determination, when the state flag has changed in the resistance calculation unit 105, the map information registration unit 602 receives the information. If the state flag has changed from the stop state to the traveling state, the process advances to step S702. If the state flag remains in the stop state, the process advances to step S703.

In step S702, the current position indicated by the vehicle position information when the state flag has changed from the stop state to the traveling state is stored in the buffer as a start position. The process then returns to step S701 to repeat the same processing as described above.

In step S703, it is determined whether or not the state flag has changed from the traveling state to the stop state. If the state flag has changed from the traveling state to the stop state, the process advances to step S704. If the state flag remains in the traveling state, the process then returns to step S701 to repeat the same processing as described above.

In step S704, the local vehicle position at the time point when the state flag has changed to the stop state is temporarily stored in the buffer as an end position, and the start position, the end position and the traveling resistance are registered in the map database in association with each other. Note that the traveling resistance registered in the map database can be the traveling resistance force itself or a resistance coefficient obtained by dividing the traveling resistance force by the gravity force that acts on the vehicle. Processing of the map information registration unit 602 thus ends.

The operation of the energy consumption calculation unit 605 will be described with reference to the flowchart of FIG. 8.

In step S801, concerning the planned route acquired from the planned route acquisition unit 604, a speed pattern when traveling the planned route is acquired. The speed pattern is speed information assumed when traveling the planned route. The speed pattern need only represent, for example, the relationship between the speed and the time elapsed from the start of traveling, and can be acquired externally. Alternatively, the route and the speed pattern may be stored in the map information DB 603 in advance in association with each other. Otherwise, the speed pattern may be calculated by obtaining the relationship between the moving distance and the speed and converting it into the relationship between the time and the speed by $$\text{Time change amount[s]} = \frac{\text{Position change amount[m]}}{\text{Speed[m/s]}}. \quad (2)$$

In step S802, an acceleration is calculated from the speed.

In step S803, the vehicle position is calculated by time-integrating the speed from the time point when the vehicle starts traveling to the time point when the calculation of step S802 is performed.

In step S804, the traveling resistance is acquired from the map database based on the vehicle position calculated in step S802. Note that when the traveling resistance acquired from the map information DB 603 is a resistance coefficient, the traveling resistance force is calculated by multiplying it by the weight of the vehicle (to be also referred to as a vehicle weight) acquired from the vehicle characteristic DB 104 and the gravitational acceleration. In this case, the traveling resistance force is calculated using, for example, $$\text{Traveling resistance force}[N] = R \times Vw \times G \quad (3).$$

R: Resistance coefficient
Vw: Vehicle weight [kg]
G: Gravitational acceleration [m/s$^2$]

In step S805, an air resistance force is calculated, from the air resistance coefficient and the frontal projected area acquired from the vehicle characteristic DB 104 and the speed obtained from the speed pattern, using $$\text{Air resistance force}[N] = \frac{R \times F \times P \times V^2}{2} \quad (4)$$

R: Air resistance coefficient

F: Frontal projected area[m$^2$]

P: Air density [kg/m$^3$]

V: Vehicle speed [m/s].

In step S806, an accelerating resistance force is calculated by multiplying the acceleration calculated in step S802 by the vehicle weight acquired from the vehicle characteristic DB 104.

In step S807, the output of the driving source is calculated by multiplying the sum of the traveling resistance, the air resistance force, and the accelerating resistance force by the vehicle speed. The output of the driving source is time-integrated at the time interval of the speed pattern, thereby calculating the energy consumption between the preceding time and the current time in the speed pattern. Note that when the vehicle characteristic DB 104 includes the efficiency of the driving source and the power transmission system, the power (electric power for an electric motor) to be input to the driving source can be obtained by dividing the output of the driving source by the efficiency, and the energy consumption can more correctly be estimated.

In step S808, it is determined whether or not the calculation has been done for all times in the speed pattern. If the calculation has been done for all times in the speed pattern, the processing ends. If the calculation has not been done for all times in the speed pattern, the process returns to step S802 to repeat the processing so as to perform the processing from step S802 to step S808 for each time to which the speed pattern is given. Finally, the consumed energies at the respective times of the speed pattern are integrated, thereby calculating the energy consumption for the planned route.

According to the above-described third embodiment, energy consumption is calculated using the traveling resistance concerning the rolling resistance and the grade resistance which largely vary depending on the location. This makes it possible to greatly improve the energy consumption estimation accuracy.

Fourth Embodiment

The fourth embodiment is different from the above-described embodiments in that energy consumption is calculated in consideration of the traveling condition of a vehicle.

An energy estimation apparatus according to the fourth embodiment will be described with reference to the block diagram of FIG. 9.

An energy estimation apparatus 900 according to the fourth embodiment includes a brake stepping amount detection unit 101, a driving source output detection unit 102, a vehicle speed detection unit 103, a vehicle characteristic DB 104, a resistance calculation unit 105, a position information acquisition unit 601, a map information DB 603, a planned route acquisition unit 604, a traveling condition acquisition unit 901 (third acquisition unit), a map information registration unit 902, and an energy consumption calculation unit 903.

The brake stepping amount detection unit 101, the driving source output detection unit 102, the vehicle speed detection unit 103, the vehicle characteristic DB 104, the resistance calculation unit 105, the position information acquisition unit 601, the map information DB 603, and the planned route acquisition unit 604 perform the same operations as in the above-described embodiments, and a description thereof will be omitted here.

The traveling condition acquisition unit 901 externally acquires the traveling condition of a vehicle. The traveling condition is information indicating a situation when a vehicle travels and includes, for example, a weather condition, a tire pressure, and a road surface state. The traveling condition is acquired from an external sensor. For example, to obtain a weather condition, including a temperature and a humidity, measurement values of a thermometer and a hygrometer, which measure the outside air temperature and humidity, respectively, are used. To obtain the presence/absence of rainfall, an optical sensor that determines water drop adhesion to the front glass is used. To obtain a tire pressure, an air pressure gauge that measures the tire pressure is used. To obtain a road surface state, an optical sensor that measures the wet condition of the road surface is used.

The map information registration unit 902 is almost the same as the map information registration unit 602 according to the third embodiment except that as information when registering a traveling resistance in the map information DB 603, the traveling condition received from the traveling condition acquisition unit 901 is also registered in the map database in addition to the start position, the end position, and the traveling resistance.

The energy consumption calculation unit 903 is almost the same as the energy consumption calculation unit 605 according to the third embodiment except that the current traveling condition is received from the traveling condition acquisition unit 901, a planned route and a traveling resistance close to the traveling condition are acquired from the map information DB 603, and energy consumption is calculated based on the acquired planned route and the traveling condition corresponding to the planned route.

According to the above-described fourth embodiment, the traveling condition of the vehicle at the time of traveling resistance calculation is registered in the map information together. This makes it possible to calculate energy consumption based on the traveling resistance under a traveling condition related to the weather condition, the road surface state, and the like when the vehicle travels and further improve the energy consumption estimation accuracy.

Fifth Embodiment

The fifth embodiment is different from the above-described embodiments in that a map information DB is stored in a server, and each vehicle including a resistance estimation apparatus communicates with the server via a network.

The conceptual view of an energy estimation system according to the fifth embodiment will be described with reference to FIG. 10.

Figure 10:
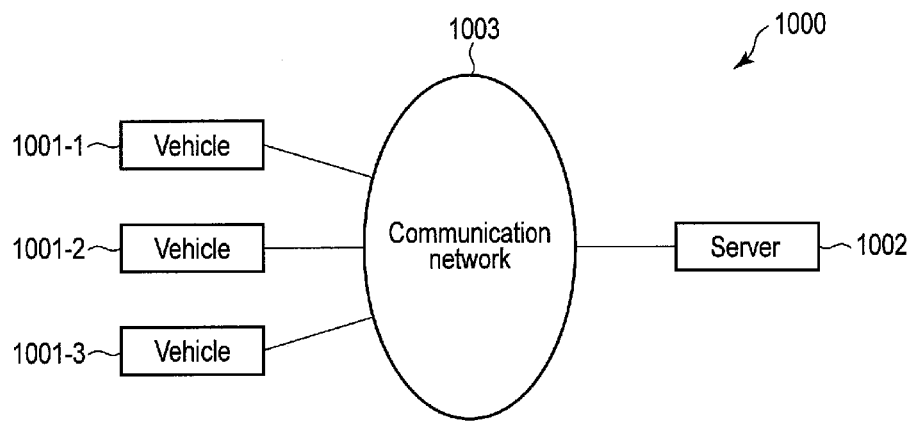
FIG. 10 is a conceptual view of an energy estimation system according to the fifth embodiment.

An energy estimation system 1000 shown in FIG. 10 includes vehicles 1001-1, 1001-2, and 1001-3, a server 1002, and a communication network 1003. Note that although a case where three vehicles 1001 are included is shown here, the number of vehicles may be four or more, or two or less.

Each of the vehicles 1001-1, 1001-2, and 1001-3 includes the above-described resistance estimation apparatus and transmits, via the communication network 1003, route information of actual travel and a traveling resistance corresponding to the route that the vehicle has traveled. Each of the vehicles 1001-1 to 1001-3 also requests a traveling resistance corresponding to a planned route from the server 1002 via the communication network 1003.

The server 1002 receives route information and a corresponding traveling resistance from each of the plurality of vehicles 1001 via the communication network 1003, and stores the route information and the traveling resistance in correspondence with each other. In response to the request of the traveling resistance corresponding to the planned route from each vehicle 1001, the server 1002 also transmits the traveling resistance of the planned route via the communication network 1003.

Note that each vehicle 1001 may transmit its own vehicle characteristic together with the route information and the traveling resistance. When the vehicle characteristic is also registered in the map database, the server 1002 can present a traveling resistance associated with a vehicle characteristic close to the characteristic of the vehicle that has requested the traveling resistance, and can raise the energy consumption estimation accuracy.

Figure 11:
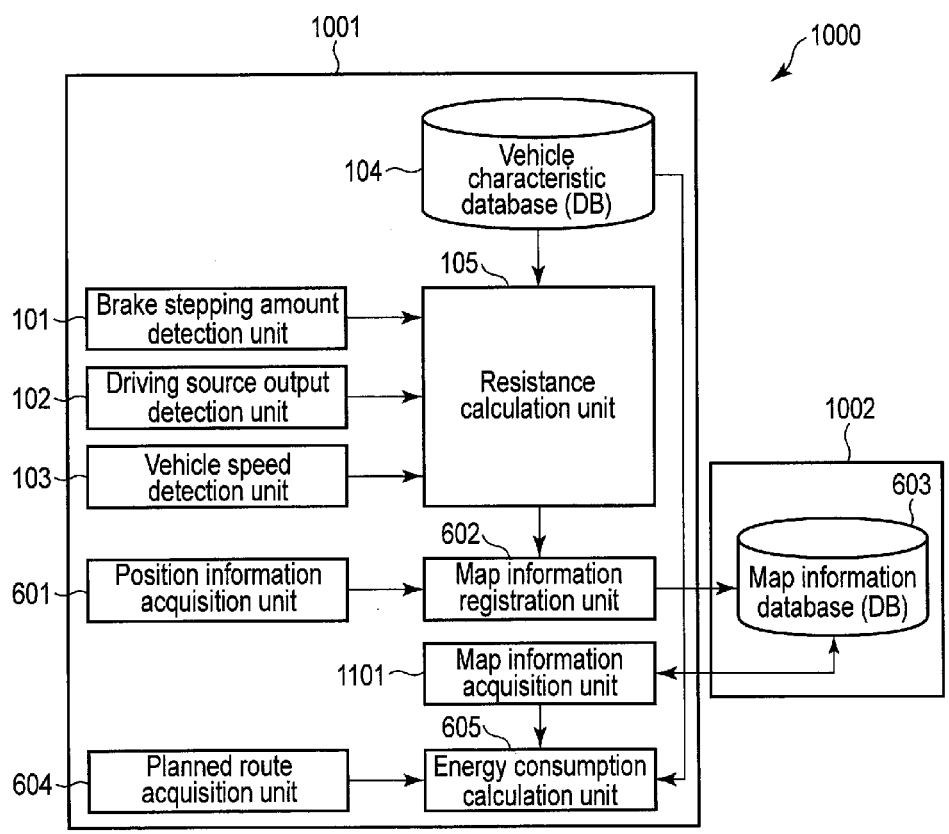
FIG. 11 is a block diagram illustrating the energy estimation system according to the fifth embodiment.

The energy estimation system 1000 according to the fifth embodiment will be described next with reference to the block diagram of FIG. 11.

The energy estimation system 1000 according to the fifth embodiment includes the vehicle 1001 and the server 1002.

The vehicle 1001 includes a brake stepping amount detection unit 101, a driving source output detection unit 102, a vehicle speed detection unit 103, a vehicle characteristic DB 104, a resistance calculation unit 105, a position information acquisition unit 601, a map information registration unit 602, a planned route acquisition unit 604, an energy consumption calculation unit 605, and a map information acquisition unit 1101. The server 1002 includes a map information DB 603.

The brake stepping amount detection unit 101, the driving source output detection unit 102, the vehicle speed detection unit 103, the vehicle characteristic DB 104, the resistance calculation unit 105, the position information acquisition unit 601, the map information registration unit 602, the map information DB 603, the planned route acquisition unit 604, and the energy consumption calculation unit 605 are the same as in the above-described embodiments, and a description thereof will be omitted here.

The map information acquisition unit 1101 requests a traveling resistance corresponding to a planned route from the server 1002, and acquires the planned route and the traveling resistance from the server 1002.

According to the above-described fifth embodiment, since the traveling resistance of a point where a plurality of vehicles have traveled to can be shared, the route coverage in the map database increases, and energy consumption can more accurately be estimated.

Sixth Embodiment

The sixth embodiment is different in that traveling resistances obtained when bidirectionally traveling the same route are registered.

Figure 9:
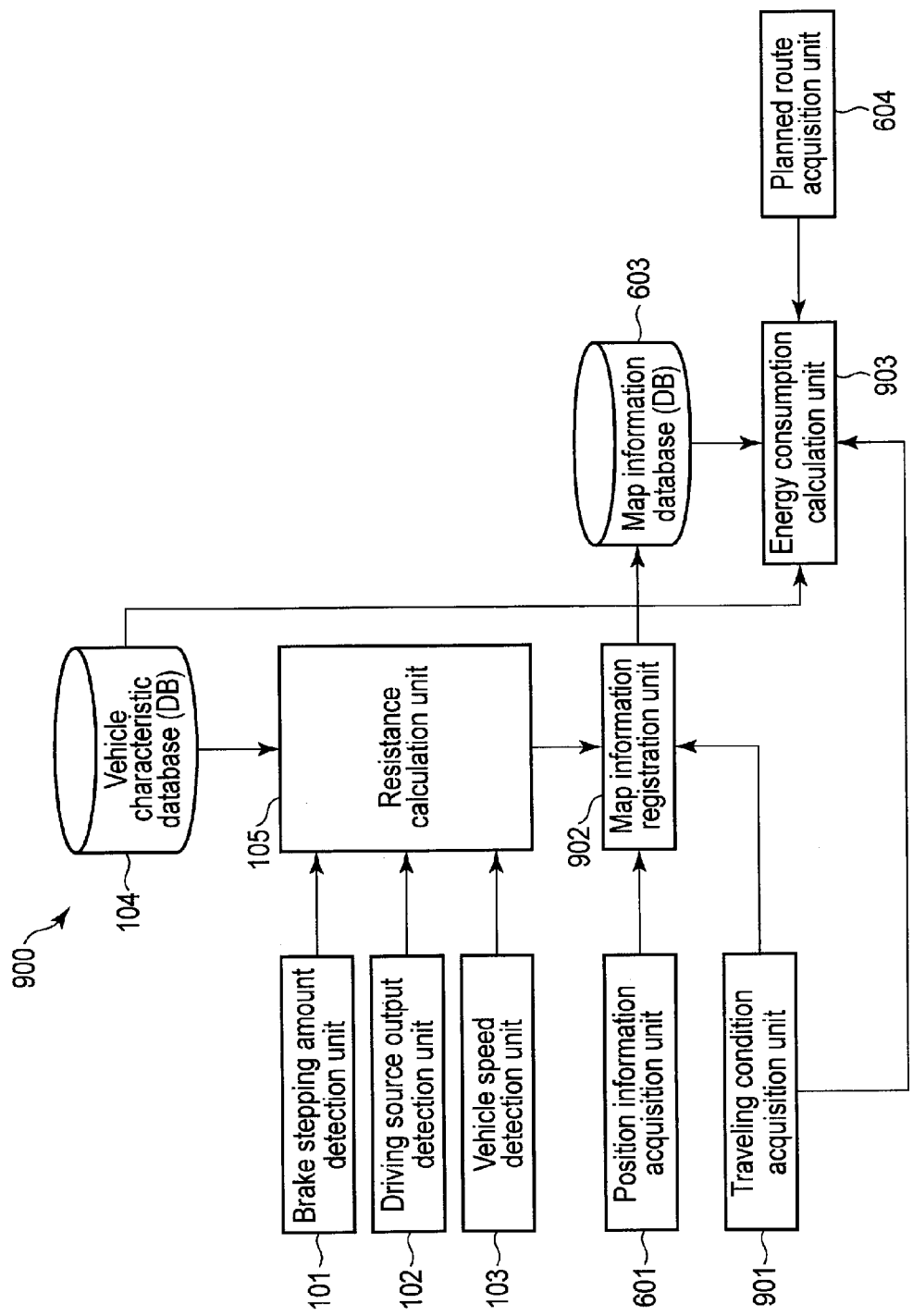
FIG. 9 is a block diagram illustrating an energy estimation apparatus according to the fourth embodiment.

The block diagram of an energy estimation apparatus according to the sixth embodiment is the same of that of the energy estimation apparatus 900 shown in FIG. 9, and a description thereof will be omitted.

The concept of bidirectionally traveling the same route will be described with reference to FIG. 12.

FIG. 12 shows one route 1201 and assumes that a vehicle travels the same route bidirectionally, that is, in a first direction from A to D and in a second direction from D to A, reverse to the first direction. Note that "same route" includes not only a case where start points and end points completely match but also a case where routes partially match. "Routes partially match" refers to a case where a route 1202 has a start point at A and an end point at C, and a route 1203 has a start point at D and an end point at B. In this case, it is determined that the route from B to C is bidirectional.

The operation of the map information registration unit 902 according to the sixth embodiment will be described with reference to the flowchart of FIG. 13. Note that steps other than steps S1301 to S1304 are the same as in steps of FIG. 7, and a description thereof will be omitted.

In step S1301, a current position acquired by a position information acquisition unit 601 is set as an end position.

In step S1302, it is determined, by designating start and end positions and referring to a map information DB 603, whether a traveling resistance when traveling the same route in a reverse direction exists in the map database. If a traveling resistance when traveling the same route in a reverse direction exists, the process advances to step S1303. If a traveling resistance when traveling the same route in a reverse direction does not exist, the process advances to step S704.

In step S1303, a rolling resistance coefficient and a road grade are calculated from a traveling resistance calculated by a resistance calculation unit 105 and the traveling resistance when traveling the same route in a reverse direction which is acquired from the map information DB 603. The rolling resistance coefficient represents a coefficient obtained by normalizing, with a normal force occurred to a tire, a resistance force generated by friction between the road surface and tires or deformation of a tire when a vehicle travels. The road grade represents the grade of a road surface. Note that the traveling resistance, the rolling resistance coefficient, and the road grade are expressed in the form of resistance coefficients obtained by dividing them by the vehicle weight and gravitational acceleration.

As a detailed calculation method of the rolling resistance coefficient and the road grade, the road grade is calculated first, and the rolling resistance coefficient is calculated next. The bidirectional traveling resistances are compared. The smaller value is subtracted from the larger value. The result is divided by 2. A value obtained by calculating an arc sine is the road grade. Let A be the traveling resistance coefficient for the larger value, and B be the traveling resistance coefficient for the smaller value. In this case, the road grade can be given by $$\text{Road grade} = \arcsin\left(\frac{\text{Resistance coefficient } A - \text{Rresistance coefficient } B}{2}\right) \quad (5)$$

Note that a larger resistance coefficient indicates an up grade, and a smaller resistance coefficient indicates a down grade.

When the average of the bidirectional resistance coefficients is divided by the cosine of the grade, a rolling resistance coefficient is obtained. The rolling resistance coefficient is calculated by $$\text{Rolling resistance coefficient} = \left(\frac{\text{Resistance coefficient } A + \text{Rresistance coefficient } B}{2 \times \cos(\text{Road grade})}\right) \quad (6)$$

In step S1304, the start and end positions, the rolling resistance coefficient, and the road grade are registered in the map information DB 603 in association with each other. At this time, the traveling resistance calculated by the resistance calculation unit 105 may be registered together. At this time, for the data obtained by traveling the same route in the reverse direction as well, the rolling resistance coefficient and the road grade are additionally registered in the map information DB 603. The operation of a map information registration unit 902 thus ends.

Figure 14:
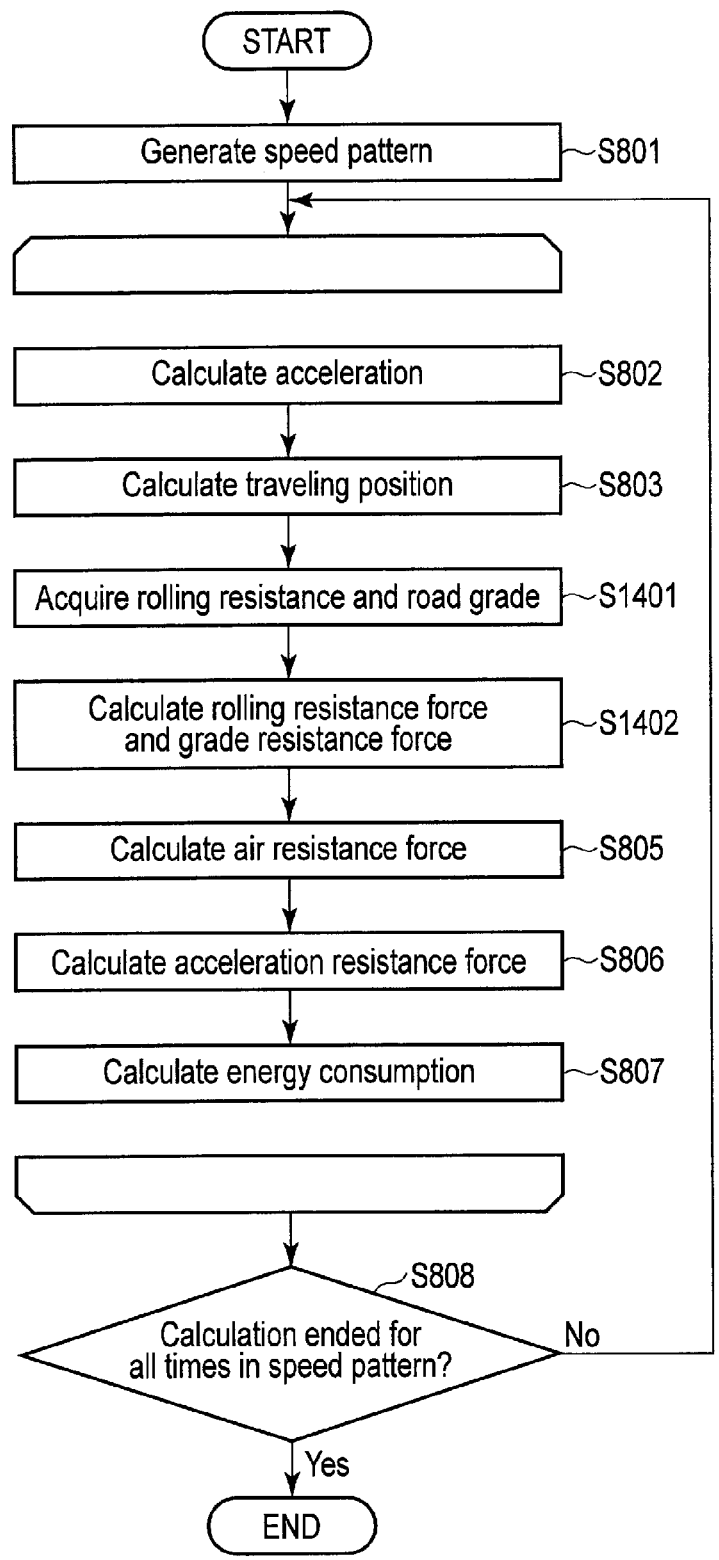
FIG. 14 is a flowchart illustrating the operation of an energy consumption calculation unit according to the sixth embodiment.

The operation of an energy consumption calculation unit 903 according to the sixth embodiment will be described next with reference to the flowchart of FIG. 14.

Figure 8:
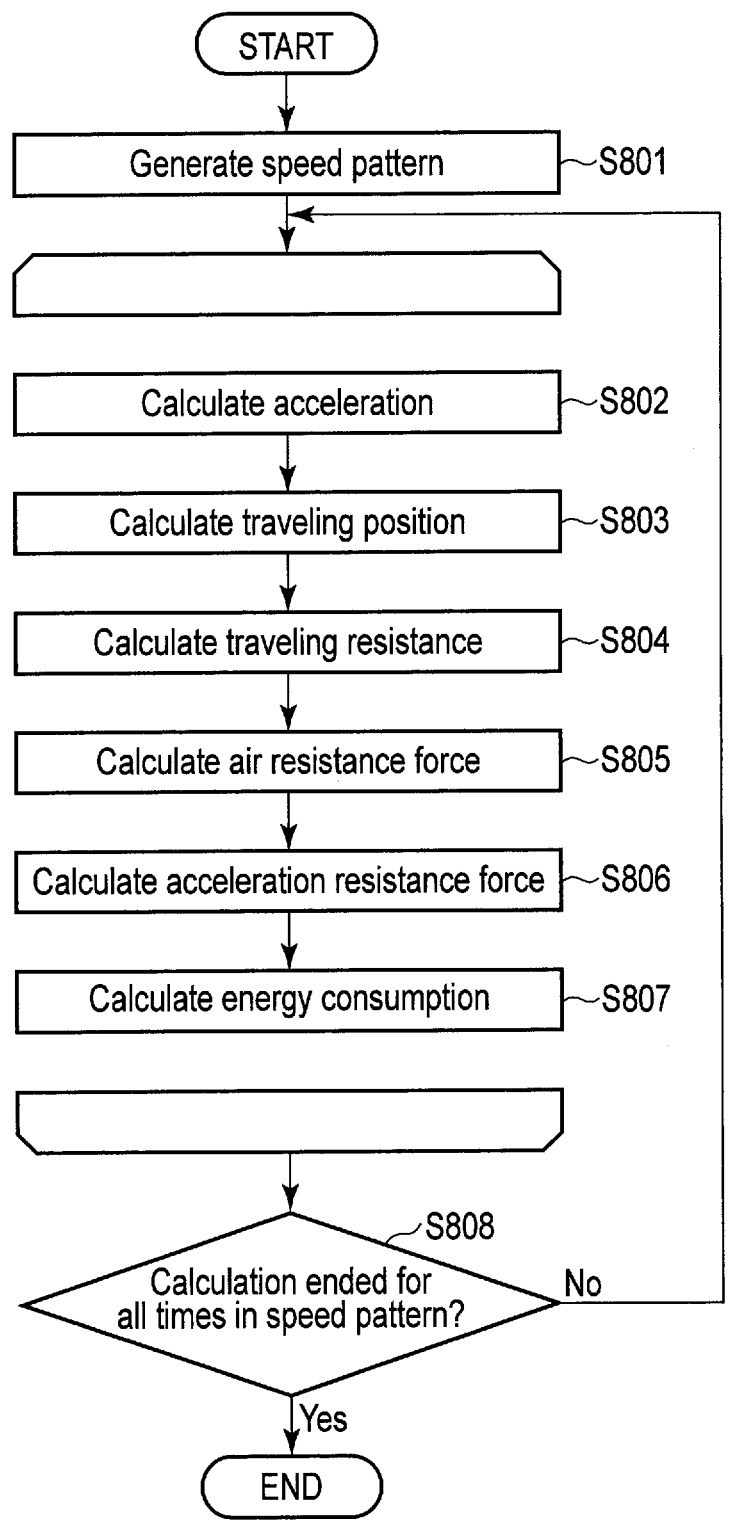
FIG. 8 is a flowchart illustrating the operation of an energy consumption calculation unit according to the third embodiment.

The processing of the energy consumption calculation unit 903 according to the sixth embodiment is the same as the flowchart of FIG. 8 except for steps S1401 and S1402, and a description thereof will be omitted.

In step S1401, instead of a resistance coefficient including two pieces of information, that is, a rolling resistance and a road grade acquired from the map information DB 603, two values, that is, a rolling resistance coefficient and a road grade are acquired.

In step S1402, a rolling resistance force and a grade resistance force are obtained by Rolling resistance force[N]=R×Vw×G×cos(Road grade) (7)

R: Rolling resistance coefficient
Vw: Vehicle weight[kg]
G: Gravitational acceleration[m/s²]

Grade resistance force[N]=Vw×G×sin(Road grade) (8)

Vw: Vehicle weight[kg]
G: Gravitational acceleration[m/s²]

FIG. 15 shows an energy consumption estimation result calculated by an energy consumption calculation apparatus according to the above-described embodiment. The horizontal axis of FIG. 15 represents time, the left vertical axis represents the vehicle speed, and the right vertical axis represents power consumption. In FIG. 15, a thin line 1501 indicates a speed; a thick broken line 1502, energy consumption (power consumption) when a vehicle (electric vehicle) has actually traveled a route of interest; and a thick line 1503, power consumption estimated by the energy estimation apparatus. An alternate long and short dashed line 1504 indicates grade information acquired from the map information DB. The route that the vehicle has traveled has an up grade in the first half and a down grade in the second half. As shown in FIG. 15, in the route that the vehicle has traveled, the difference between the simulated power consumption and the actual power consumption is small, and the energy consumption is accurately estimated.

According to the above-described sixth embodiment, a rolling resistance coefficient and a road grade are separately calculated for a traveling resistance when bidirectionally traveling the same route. This makes it possible to further generalize the rolling resistance coefficient and the road grade and more accurately estimate energy consumption.

Comparative Example

On the other hand, FIG. 16 shows an energy consumption estimation result calculated by a conventional method assuming that the rolling resistance and the road grade do not vary depending on a point.

As is apparent from FIG. 16, in the road grade of the second half, the difference between the simulated energy consumption and the actual power consumption is large, and the energy consumption estimation accuracy is small.

On the other hand, the energy consumption calculated by the energy estimation apparatus according to the above-described embodiment is correct even in the road grade of the second half, as shown in FIG. 15. As can be seen from comparison of FIGS. 15 and 16, the energy consumption estimation accuracy remarkably improves.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A resistance estimation apparatus, comprising:
a first detection unit configured to detect an output value of a driving source of a vehicle;
a second detection unit configured to detect a braking value of a braking force of a brake of the vehicle;
a third detection unit configured to detect a speed of the vehicle; and
a first calculation unit configured to calculate a traveling resistance resulting from a road surface on which the vehicle has traveled during a traveling period, using a vehicle characteristic, the output value, the braking value and the speed, the traveling period including a period from a first time point when the vehicle starts and the speed changes from zero to a second time point when the vehicle stops and the speed changes to zero, the vehicle characteristic representing a characteristic of the vehicle including a weight of the vehicle and a frontal projected area of the vehicle.

2. The apparatus according to claim 1, wherein the traveling period further includes a first period and a second period, the first period being between the first time point and a third time point going back a first time from the first time point, the second period being between the second time point and a fourth time point after an elapse of a second time from the second time point.

3. The apparatus according to claim 1, further comprising:
a fourth detection unit configured to detect an operation state of an accessory which operates by receiving energy from the driving source; and
a storage configured to store a power in the operation state of the accessory,
wherein the first calculation unit calculates the traveling resistance based on the power.

4. The apparatus according to claim 1, wherein the first calculation unit calculates, during the traveling period, an air resistance loss energy based on the vehicle characteristic and the speed, an driving source output energy based on the output value, and a brake loss energy based on the braking value, and calculates the traveling resistance using the air resistance loss energy, the driving source output energy and the brake loss energy, the air resistance loss energy being loss energy due to air resistance, the driving source output energy being output energy of the driving source, the brake loss energy being loss energy by the brake.

5. An energy estimation apparatus, comprising:
the resistance estimation apparatus according to claim 1;
a first acquisition unit configured to acquire position information relating to a position of the vehicle;
a registration unit configured to register, in a database, the traveling resistance and a map route in correspondence with each other based on the position information, the map route being a route on a map corresponding to a real route that the vehicle has traveled during the traveling period;
a second acquisition unit configured to acquire a planned route to a destination; and
a second calculation unit configured to calculate energy consumption when traveling the planned route, based on the vehicle characteristic, a corresponding traveling resistance and a speed pattern, the corresponding traveling resistance being a traveling resistance relating to a map route corresponding to the planned route, the speed pattern being speed information assumed when traveling the planned route.

6. The apparatus according to claim 5, further comprising a third acquisition unit configured to acquire a traveling condition including a weather condition and a road surface state when the vehicle travels,
wherein the registration unit registers, in the database, the traveling resistance and the traveling condition when the traveling resistance has been calculated in correspondence with each other, and
the second calculation unit calculates the energy consumption based on a traveling resistance calculated in advance under a condition corresponding to a current traveling condition.

7. The apparatus according to claim 5, wherein if traveling resistances upon bidirectionally traveling the same route exist in the database, the registration unit calculates, based on the traveling resistances upon bidirectionally, a rolling resistance coefficient and a road grade, and registers the rolling resistance coefficient and the road grade in the database, the rolling resistance coefficient representing a resistance relating to a friction between the road surface and tires when the vehicle travels, the road grade representing a grade of the road surface;
the second calculation unit calculates the energy consumption based on the rolling resistance coefficient and the road grade.

8. An energy estimation system, comprising:
an energy estimation apparatus; and a server,
the energy estimation apparatus comprising:
the resistance estimation apparatus according to claim 1;
a first acquisition unit configured to acquire position information relating to a position of the vehicle; and
a registration unit configured to register, in a database, the traveling resistance and a map route in correspondence with each other based on the position information, the map route being a route on a map corresponding to a real route that the vehicle has traveled during the traveling period,
the server comprising a storage configured to store the database,
wherein the energy estimation apparatus further comprises:
a second acquisition unit configured to acquire a planned route to a destination by a user's input, and receive, from the server, a corresponding traveling resistance that is a traveling resistance corresponding to a map route corresponding to the planned route; and
a second calculation unit configured to calculate energy consumption when traveling the planned route, based on the vehicle characteristic, the corresponding traveling resistance, and a speed pattern being speed information assumed when traveling the planned route.

9. A resistance estimation method, comprising:
causing a processor to execute computer executable instructions, wherein the instructions cause the processor to:
detect an output value of a driving source of a vehicle;
detect a braking value of a braking force of a brake of the vehicle;
detect a speed of the vehicle; and
calculate a traveling resistance resulting from a road surface on which the vehicle has traveled during a traveling period, using a vehicle characteristic, the output value, the braking value and the speed, the traveling period including a period from a first time point when the vehicle starts and the speed changes from zero to a second time point when the vehicle stops and the speed changes to zero, the vehicle characteristic representing a characteristic of the vehicle including a weight of the vehicle and a frontal projected area of the vehicle.

10. The method according to claim 9, wherein the traveling period further includes a first period and a second period, the first period being between the first time point and a third time point going back a first time from the first time point, the second period being between the second time point and a fourth time point after an elapse of a second time from the second time point.

11. The method according to claim 9, wherein the instructions cause the processor to:
    detect an operation state of an accessory which operates by receiving energy from the driving source; and
    store a power in the operation state of the accessory,
    wherein the calculating the traveling resistance calculates the traveling resistance based on the power.

12. The method according to claim 9, wherein the calculating the traveling resistance calculates, during the traveling period, an air resistance loss energy based on the vehicle characteristic and the speed, an driving source output energy based on the output value, and a brake loss energy based on the braking value, and calculates the traveling resistance using the air resistance loss energy, the driving source output energy and the brake loss energy, the air resistance loss energy being loss energy due to air resistance, the driving source output energy being output energy of the driving source, the brake loss energy being loss energy by the brake.

13. A non-transitory computer readable medium including computer executable instructions, wherein the instructions, when executed by a processor, cause the processor to perform a method comprising:
    detecting an output value of a driving source of a vehicle;
    detecting a braking value of a braking force of a brake of the vehicle;
    detecting a speed of the vehicle; and
    calculating a traveling resistance resulting from a road surface on which the vehicle has traveled during a traveling period, using a vehicle characteristic, the output value, the braking value and the speed, the traveling period including a period from a first time point when the vehicle starts and the speed changes from zero to a second time point when the vehicle stops and the speed changes to zero, the vehicle characteristic representing a characteristic of the vehicle including a weight of the vehicle and a frontal projected area of the vehicle.

14. The medium according to claim 13, wherein the traveling period further includes a first period and a second period, the first period being between the first time point and a third time point going back a first time from the first time point, the second period being between the second time point and a fourth time point after an elapse of a second time from the second time point.

15. The medium according to claim 13, further comprising:
    detecting an operation state of an accessory which operates by receiving energy from the driving source; and
    storing a power in the operation state of the accessory,
    wherein the calculating the traveling resistance calculates the traveling resistance based on the power.

16. The medium according to claim 13, wherein the calculating the traveling resistance calculates, during the traveling period, an air resistance loss energy based on the vehicle characteristic and the speed, an driving source output energy based on the output value, and a brake loss energy based on the braking value, and calculates the traveling resistance using the air resistance loss energy, the driving source output energy and the brake loss energy, the air resistance loss energy being loss energy due to air resistance, the driving source output energy being output energy of the driving source, the brake loss energy being loss energy by the brake.

* * * * *